Sept. 16, 1924.

Re. 15,916

F. T. FLINCHBAUGH

CYLINDER REBORING MACHINE

Original Filed Dec. 14, 1920. 2 Sheets-Sheet 1

Inventor:
F. T. Flinchbaugh,
By
Atty.

Sept. 16, 1924. Re. 15,916

F. T. FLINCHBAUGH

CYLINDER REBORING MACHINE

Original Filed Dec. 14, 1920 2 Sheets-Sheet 2

Inventor:
F. T. Flinchbaugh,
By
E. E. Bradford
Att'y.

Reissued Sept. 16, 1924. Re. 15,916

UNITED STATES PATENT OFFICE.

FREDERICK T. FLINCHBAUGH, OF YORK, PENNSYLVANIA, ASSIGNOR TO WAYNE TOOL MANUFACTURING COMPANY, OF WAYNESBORO, PENNSYLVANIA, A CORPORATION OF PENNSYLVANIA.

CYLINDER-REBORING MACHINE.

Original No. 1,483,061, dated February 5, 1924, Serial No. 430,640, filed December 14, 1920. Application for reissue filed May 12, 1924. Serial No. 712,886.

*To all whom it may concern:*

Be it known that I, FREDERICK T. FLINCHBAUGH, a citizen of the United States, residing at York, in the county of York and State of Pennsylvania, have invented certain new and useful Improvements in Cylinder-Reboring Machines, of which the following is a specification.

This invention relates to an improved machine for reboring engine cylinders and seeks as one of its principal objects to provide a portable device of this character which may be secured to an engine block and operated for selectively reboring the cylinders of the block.

The invention has as a further object to provide a machine employing a separable cutter carrying gear case and base, and wherein, after a cylinder has been rebored, the gear case may simply be detached from the base for removing the cutter from the cylinder so that the work may be inspected without detaching the base from the engine block until the work is finally completed.

And the invention has as a still further object to provide a machine employing one base for use in connection with cylinders up to a certain diameter and a larger base for use in connection with cylinders of larger diameter and wherein means will be provided whereby the gear case may be selectively used upon either base, thus dispensing with the necessity for a separate gear case for each base.

Other and incidental objects will appear hereinafter.

Figure 1:
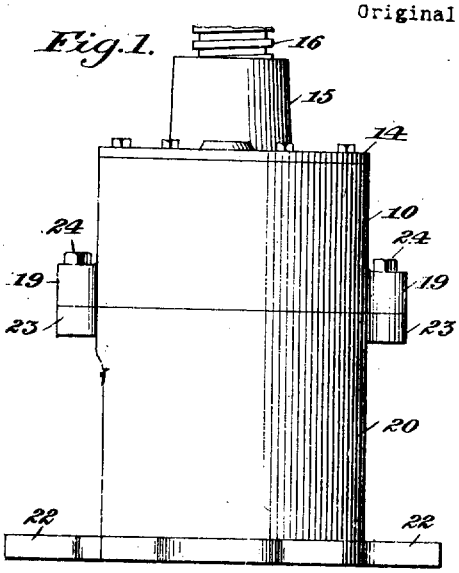
Figure 3:
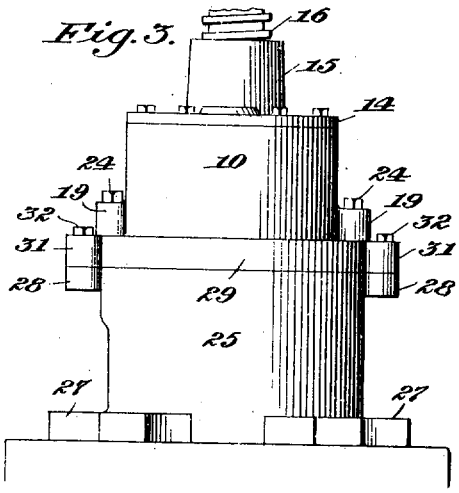
Figure 2:
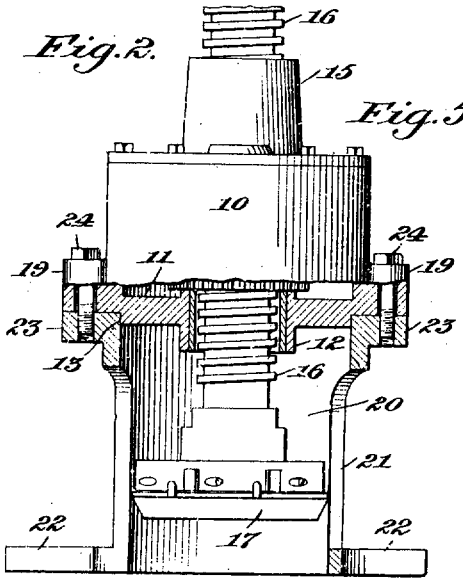
Figure 5:
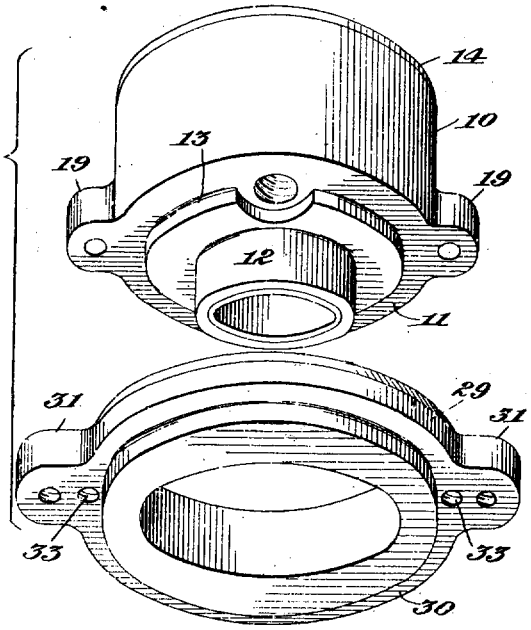
Figure 4:
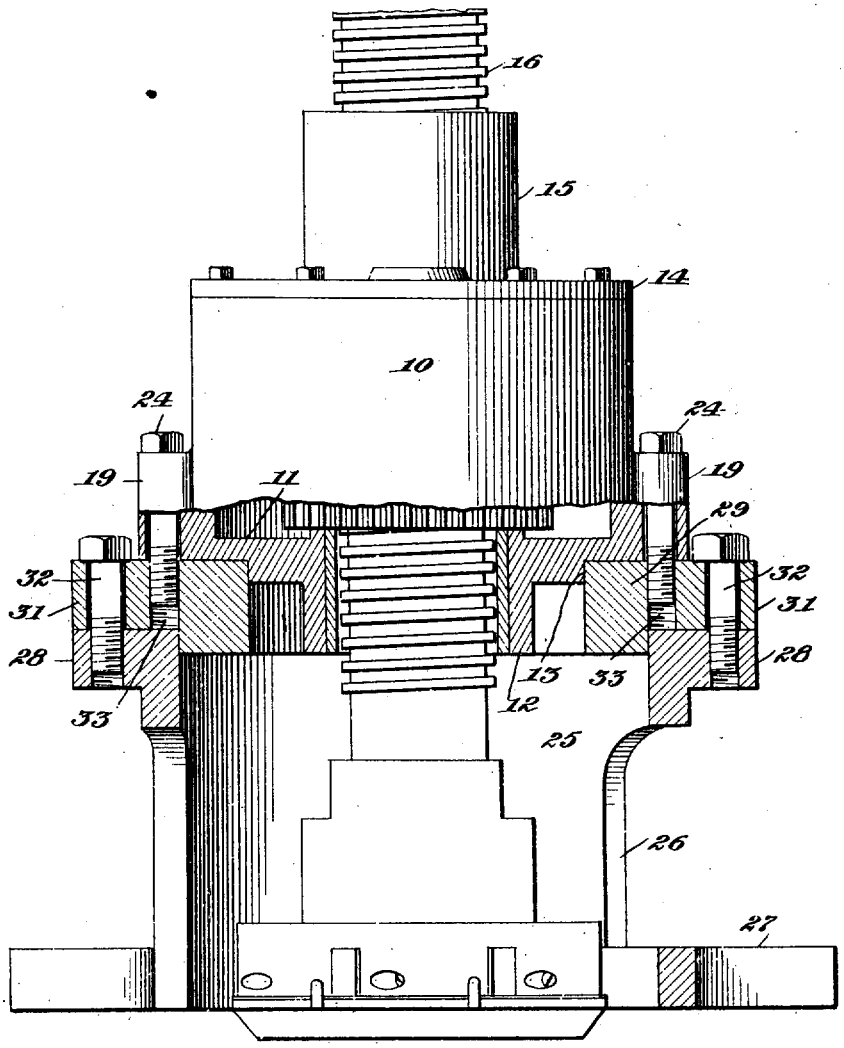

Referring to the accompanying drawings, which are made a part hereof and on which similar reference characters indicate similar parts, Figure 1 is a fragmentary side elevation of my improved reboring machine showing the gear case of the machine in connection with the smaller of the bases provided, Figure 2 is a fragmentary section particularly showing the mounting of the gear case upon the base, Figure 3 is a fragmentary side elevation showing the gear case in connection with the larger of the bases employed, Figure 4 is an enlarged fragmentary section particularly showing the reducing ring employed in connection with the larger of the bases, and Figure 5 is a perspective view showing the gear case and reducing ring in detail.

In carrying the invention into effect, I employ a gear case 10 having a bottom wall 11 from which depends a bearing 12 and surrounding said bearing, as particularly shown in Figure 5 of the drawings, is an annular centering shoulder or boss 13 integral with the bottom wall. Closing the gear case is a cover 14 from which rises a bearing 15 alining with the bearing 12 and journaled through these bearings is a feed screw 16 upon the lower end of which is normally fixed a cutter 17. Since the exact manner in which the feed screw is operated, as well as the construction of the cutter, does not concern the present invention, these details are not brought out. Projecting from the side wall of the gear case at opposite sides thereof are apertured ears 19, the lower sides of which are flush with the bottom wall 11.

In connection with the gear case 10 I provide a cylindrical base 20. This base is provided with sight openings 21 while from the lower end of the base projects a plurality of lugs 22. As will be observed upon reference to Figure 2, the boss 13 of the gear case is adapted to fit snugly within the upper end of the base so that the gear case may thus rest upon the upper end edge of the base mating therewith and projecting from the base at its upper end are radial apertured ears 23 adapted to register with the ears 19. Freely fitting through the latter ears and threaded into the ears of the base are cap bolts 24 rigidly securing the gear case upon the base.

In practice, the base is, as suggested in Figure 1, rested upon an engine block over one of the cylinders therein, the base being, of course, centered with respect to the cylinder. Bolts are then arranged to coact between the lugs 22 and the block for firmly securing the base thereto. Accordingly, the feed screw 16 may then be operated for advancing the cutter 17 and reboring the cylinder. After the cutter has passed through the cylinder it is usually necessary to remove the cutter and examine the progress of the work. In the present construction this may be accomplished by simply removing the cap bolts 24 and displacing the gear case. Consequently, the centering of the base will be undisturbed so that should it be found necessary to again pass the cutter through the cylinder, the gear case may be replaced, when the cutter will be accurately trued with respect to the cylinder.

For engine cylinders of small diameter, the base 20 will prove entirely adequate. However, it is necessary to employ, in connection with engine cylinders above a certain size, a larger base adapted to accommodate a larger cutter. Consequently, to avoid the necessity of employing an individual gear case for each base I have provided means whereby a single gear case may be used not only in connection with the base 20 but also in connection with a larger base. In Figures 3 and 4 of the drawings, the larger base is indicated at 25. This base is substantially identical structurally with the base 20, the bases varying in proportions only. As will be observed, the base 25 is formed with sight openings 26 corresponding to the sight openings 21, while at the lower end of said base is provided a plurality of lugs 27 corresponding to the lugs 22. Projecting from the upper end of the larger base, at opposite sides thereof, are oppositely disposed apertured ears 28 corresponding to the ears 19 of the base 20. A reducing ring 29 is employed. This ring is formed to seat against the upper end edge of the base 25 mating therewith and is, as particularly shown in Figure 5, provided at its lower side with an annular shoulder or centering boss 30 adapted to fit snugly within the base. Projecting from the ring at opposite sides thereof are apertured ears 31 disposed to mate with the ears 28 and freely fitting through the ears of the ring and threaded into the ears 28 are cap bolts 32 rigidly securing the ring in position. The ring is of an internal diameter to receive snugly the boss 13 of the gear case 10 so that, as shown in Figure 4, the gear case may be rested against the upper edge of the ring mating therewith, the boss projecting into the ring. Formed in the ring at the plane of the ears 31 are threaded openings 33 adapted to register with the ears 19 of the gear case and freely fitting through said ears and threaded into these openings are the cap bolts 24. Thus, the gear case will be securely fixed upon the larger base so that a larger cutter may be employed in connection with the feed screw. To displace the gear case and withdraw the cutter, the ring 29 may be detached, leaving the base secured to the cylinder block centered with respect to the cylinder being rebored. Accordingly, just as when the smaller base is employed, the work may be inspected without molesting the centering of the base so that when the ring is replaced, the reboring operation may immediately progress.

Having thus fully described my said invention, what I claim as new and desire to secure by Letters Patent is:

1. In a cylinder reboring machine, the combination with a gear case carrying a boring head and having an annular shoulder concentric with said head; of a base having a bore coincident with said annular shoulder and adapted to be attached to an engine cylinder, ears on said gear case and bolts engaging with said ears and threaded in said base for securing the gear case and base together; and a second base having a bore of larger diameter than said first base, an adapter intended to be inserted between said second base and said gear case and having a bore of the same diameter as said first base and a seat of the same diameter as the second base adapted to fit the bore thereof; means for rigidly securing said adapter to said second base, and tapped apertures provided in said adapter for said bolts, whereby the gear case may be shifted from said first base to said second base and attached to said adapter, substantially as set forth.

2. In a cylinder reboring machine, a boring head, a gear case carrying the boring head, a cylindrical base having means for attachment to a cylinder block with its bore in alinement with a cylinder, interfitting means on the gear case and the base for alining the boring head with said cylinder, means for securing the case and the head together, a base similar to the first having a bore of larger diameter, an adapter ring, interfitting means on the ring and the second base for locating said ring coaxially with said base, and means for securing the case and the base rigidly together, substantially as set forth.

3. In a cylinder reboring machine, a boring head, a gear case carrying the head, an adapter ring, means for securing the ring to the gear case, a plurality of bases differing in size, means for securing one of said bases directly to the gear case, means for securing a larger base to the adapter ring, centering means on the gear case the adapter ring and said bases whereby the parts are guided into concentric relation to the boring head, and means for securing either base to a cylinder block with said head coaxial with a cylinder, substantially as set forth.

4. In a cylinder reboring machine, a boring head, a gear case carrying the head, an adapter ring, means for securing the ring to the gear case, a plurality of bases differing in size, means for securing one of said bases directly to the gear case, means for securing a larger base to the adapter ring, concentric shoulders on the gear case the adapter ring and said bases whereby the parts are guided into concentric relation to the boring head, and means for securing the bases to a cylinder block with said head coaxial with a cylinder, substantially as set forth.

5. In a cylinder reboring machine, a boring head, a gear case carrying the head, an adapter ring, means for securing the ring to the gear case, a plurality of bases differing in size, means for securing one of said bases directly to the gear case, means for securing a larger base to the adapter ring, centering means on the gear case the adapter ring and said bases whereby the parts are guided into concentric relation to the boring head, and means for securing either base to a cylinder block with said head coaxial with a cylinder, said bases having bores larger than the boring head whereby the boring head may be removed without disturbing the centering of the base, substantially as set forth.

In witness whereof, I have hereunto set my hand at Washington, D. C., this 9th day of May, A. D. nineteen hundred and twenty-four.

FREDERICK T. FLINCHBAUGH.